US012773819B2

(12) United States Patent
Wuensche et al.

(10) Patent No.: US 12,773,819 B2
(45) Date of Patent: Oct. 27, 2026

(54) CONTAINER TREATMENT SYSTEM FOR PRODUCING AND TREATING PREFORMS

(71) Applicant: Krones AG, Neutraubling (DE)

(72) Inventors: Dieter Wuensche, Straubing (DE); Christian Killermann, Roetz (DE); Norbert Kindl, Tegernheim (DE); Andreas Roth, Erlangen (DE); Florian Nebl, Mintraching (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 125 days.

(21) Appl. No.: 18/778,508

(22) Filed: Jul. 19, 2024

(65) Prior Publication Data

US 2025/0026065 A1 Jan. 23, 2025

(30) Foreign Application Priority Data

Jul. 19, 2023 (DE) ......................... 102023119034.2

(51) Int. Cl.

| | |
|---|---|
| ***B29C 49/78*** | (2006.01) |
| ***B29C 49/06*** | (2006.01) |
| ***B29C 49/42*** | (2006.01) |
| *B29B 11/08* | (2006.01) |
| *B29C 49/02* | (2006.01) |

(Continued)

(52) U.S. Cl.

CPC .............. *B29C 49/78* (2013.01); *B29C 49/06* (2013.01); *B29C 49/4205* (2013.01); *B29C 49/42065* (2022.05); *B29C 49/42109* (2022.05); *B29C 49/4238* (2022.05); *B29B 11/08* (2013.01); *B29C 2049/023* (2013.01); *B29C 49/36* (2013.01); *B29C 49/42057* (2022.05); *B29C 49/42093* (2022.05); *B29C 49/42101* (2022.05); *B29C 49/42808* (2022.05); *B29C 2049/7878* (2022.05); *B29C 2049/78805* (2022.05); *B29C 2949/0715* (2022.05); *B29K 2023/06* (2013.01); *B29K 2023/12* (2013.01); *B29K 2067/003* (2013.01); *B29L 2031/7158* (2013.01)

(58) Field of Classification Search

None

See application file for complete search history.

(56) References Cited

U.S. PATENT DOCUMENTS

| | | | | |
|---|---|---|---|---|
| 8,506,869 | B2 | 8/2013 | Lappe et al. | |
| 2011/0175246 | A1 * | 7/2011 | Winzinger | B29C 48/92 425/170 |

(Continued)

FOREIGN PATENT DOCUMENTS

| | | | |
|---|---|---|---|
| DE | 102010029644 | A1 | 12/2011 |
| DE | 102012101114 | A1 | 8/2013 |

(Continued)

*Primary Examiner* — Yung-Sheng M Tsui
*Assistant Examiner* — Melody Tsui
(74) *Attorney, Agent, or Firm* — McCoy Russell LLP

(57) ABSTRACT

A container treatment system for producing and treating preforms, wherein the container treatment system comprises a production machine for producing preforms, at least one container treatment machine arranged downstream of the production machine in a transport direction of the preforms, and a control unit, wherein the control unit is configured to control a flow of preforms in the container treatment system based on a component of the container treatment system being down.

15 Claims, 2 Drawing Sheets

(51) Int. Cl.

| | |
|---|---|
| *B29C 49/36* | (2006.01) |
| *B29K 23/00* | (2006.01) |
| *B29K 67/00* | (2006.01) |
| *B29L 31/00* | (2006.01) |

(56) References Cited

U.S. PATENT DOCUMENTS

| | | | | |
|---|---|---|---|---|
| 2011/0298145 | A1* | 12/2011 | Lappe | B29C 49/02 425/143 |
| 2013/0061557 | A1* | 3/2013 | Kitano | B29C 45/76 53/167 |
| 2015/0298906 | A1 | 10/2015 | Marastoni | |
| 2020/0290260 | A1* | 9/2020 | Hirdina | B65G 51/035 |
| 2022/0063173 | A1* | 3/2022 | Hirdina | B29C 49/06 |

FOREIGN PATENT DOCUMENTS

| | | | |
|---|---|---|---|
| EP | 2641721 | A1 | 9/2013 |
| IM | MO20080272 | A1 | 4/2010 |
| IT | MO20080272 | A1 | 4/2010 |

* cited by examiner

CONTAINER TREATMENT SYSTEM FOR PRODUCING AND TREATING PREFORMS

CROSS REFERENCE TO RELATED APPLICATION

The present application claims priority to German Patent Application No. 10 2023 119 034.2 filed on Jul. 19, 2023. The entire contents of the above-listed application are hereby incorporated by reference for all purposes.

TECHNICAL FIELD

The present disclosure relates to a container treatment system for producing and treating preforms and to a corresponding method.

BACKGROUND

Container cleaning systems are well known from the prior art. Container treatment systems typically include a blow molding machine, which can be used to form preforms into containers. In prior art, however, the preforms are not produced in the container treatment system itself, but in a process that is separate in time and location. An injection molding method is typically used to produce the preforms.

SUMMARY

However, the production of preforms and their further processing, separated in terms of time and location, into containers has a number of disadvantages. For example, the preforms can be damaged or lose their sterility during transport from the production site to the container treatment system. Also, the transportation or storing of the preforms is associated with relatively high transportation or storage costs.

Problem

Based on the known prior art, the technical object of the present disclosure to be achieved is to make the production and processing process of preforms more efficient while minimizing error-related downtimes of the container treatment system.

Solution

This object is achieved by the container treatment system for producing and treating preforms as described herein.

According to the disclosure, a container treatment system for producing and treating preforms is provided, wherein the container treatment system comprises a production machine for producing preforms, in particular an injection molding machine, at least one container treatment machine arranged downstream of the production machine in a transport direction of the preforms, and a control unit, wherein the control unit is configured to control a flow of preforms in the container treatment system based on a component of the container treatment system being down.

The production machine is optionally configured to produce preforms used in the beverage industry from plastic, optionally polyethylene terephthalate (PET), polyethylene (PE) or polypropylene (PP). However, this type of design is to be understood as not limiting. The production machine can also be designed to produce preforms of any type from any plastic or thermoplastic material.

The production machine can be in particular an injection molding machine. Alternatively, it can also be a device for producing preforms by means of a compression molding method or a device for producing preforms by means of an injection compression molding method. However, it can also be any other apparatus suitable for producing a preform.

The at least one container treatment machine can be any type of device suitable for treating containers. It can be, for example, a blow molding machine, such as a stretch blow molding machine or an extrusion blow molding machine. The blow molding machine can be designed to form the preforms into containers, optionally bottles used in the beverage industry. However, the at least one container treatment machine can also be a device for pretreating containers, such as a device for corona or plasma pretreatment, a filler for filling containers with a beverage or any other liquid, a labeling machine, a direct printing machine, or a capper for capping containers. In one embodiment, it may also be provided for any combination of the above-mentioned or any other container treatment machine to be arranged downstream of the production machine in a transport direction of the preforms.

A component of the container treatment system can be understood to mean, for example, the at least one container treatment machine or the production machine. However, the term component can also mean an optional transport device which, for example, connects the production machine to the at least one container treatment machine or which connects several container treatment machines with one another. However, the component may also be any other component of the container treatment system that may be down.

A downtime is a malfunction that may be caused, for example, by a defect or blockage in a component, or a maintenance-related downtime of a component that may be caused, for example, by a maintenance-related replacement of a subcomponent of the component or by an upcoming replacement of a consumable of the component.

Controlling a flow of preforms is understood to mean in particular a removal of preforms from the production machine and/or a supply of preforms to the at least one container treatment machine.

The container treatment system according to the disclosure allows for preforms to be manufactured and further processed in a system, thus preventing transport-related damage or decontamination of the preforms. Sorting out preforms in the container treatment system that have been damaged or contaminated during transport is therefore not necessary, which can increase the efficiency of the system's operation. Moreover, by controlling the flow of preforms based on a component being down, operation of the container treatment system can be at least partially maintained even if a component is down. This ensures that the container treatment system operates as efficiently as possible and, in particular, that downtimes of the entire container treatment system due to malfunctions or maintenance can be avoided.

In one embodiment, it may be provided for the component to comprise the at least one container treatment machine. Thus, by controlling the flow of preforms, continued operation of the production machine and/or of other components of the container treatment machine can be ensured even if the at least one container treatment machine is down.

In one embodiment, when a downtime period is less than a threshold value, controlling the flow of preforms may include transferring the preforms produced by the production machine to a first storage device. Storing the preforms produced by means of the production machine in the first storage device ensures the continued operation of the production machine even if the at least one container treatment machine is down. Since the preforms are transferred to the first storage device only until the downtime period reaches a threshold value, the number of preforms transferred to the first storage device can be flexibly adjusted.

In a development of the two preceding embodiments, when a downtime period is greater than a threshold value, controlling the flow of preforms may comprise transferring the preforms produced by the production machine to a box for rejects for shredding the preforms, in particular a shredder. An overproduction of preforms can thus be prevented without having to interrupt the operation of the production machine; also, by shredding them, excess preforms can be handled in the most space-saving way possible.

In one embodiment, the control unit may be configured to determine the threshold value based on a storage capacity of the first storage device. This ensures that the preforms produced by the production machine are shredded by the box for rejects only when the storage capacity of the first storage device is completely exhausted, thus preventing unnecessary material consumption.

In one embodiment, the component may comprise the production machine. Thus, when the production machine is down, the flow of preforms can be controlled such that operation of the at least one container treatment machine is maintained and a downtime of the entire container treatment system is avoided.

In a development of the preceding embodiment, controlling the flow of preforms may comprise supplying preforms to the at least one container treatment machine from a second storage device. By supplying the preforms from the second storage device, a continuous supply of preforms to the at least one container treatment machine can be ensured even if the production machine is down.

In one embodiment, the first and second storage devices can be identical and designed as one storage unit. In that case, for example, the preforms supplied to the storage unit when the blow molding machine is down can be supplied again to the at least one container treatment machine at a later point in time, which may be the case, for example, when the production machine is down.

In a development of the preceding embodiment, a sorting device can be arranged between the second storage device and the at least one container treatment machine, and the preforms can be supplied to the at least one container treatment machine in a sorted manner. This ensures that the preforms, which are typically stored as bulk material in the storage device, are separated before being supplied to the at least one container treatment machine and are transferred to the at least one container treatment machine in a sorted manner and, in particular, that a possible blockage at the at least one container treatment machine caused by unsorted preforms is prevented.

In one embodiment, the sorting device can be designed as a roller sorter or disk sorter. These embodiments allow for reliably sorting the preforms, in particular for aligning the preforms Moreover, according to the disclosure, a method for producing and treating preforms in a container treatment system is provided, wherein the container treatment system comprises a production machine for producing preforms, in particular an injection molding machine, at least one container treatment machine arranged downstream of the production machine in a transport direction of the preforms, and a control unit, wherein a flow of preforms in the container treatment system is controlled by the control unit based on a component of the container treatment system being down.

By controlling the flow of preforms based on a component being down, operation of the container treatment system can be at least partially maintained even if a component is down. This ensures that the container treatment system operates as efficiently as possible and, in particular, that downtimes of the entire container treatment system due to malfunctions or maintenance can be avoided.

In one embodiment, the component may comprise the at least one container treatment machine. Thus, by controlling the flow of preforms, for example continued operation of the production machine of the container treatment machine can be ensured even if the at least one container treatment machine is down.

In a development of this embodiment, when a downtime period is less than a threshold value, the flow of preforms can be controlled such that the preforms produced by the production machine are transferred to a first storage device. Storing the preforms produced by means of the production machine in the first storage device ensures the continued operation of the production machine even if the at least one container treatment machine is down. Since the preforms are transferred to the first storage device only until the downtime period reaches a threshold value, the number of preforms transferred to the storage device can be flexibly adjusted.

In a development of the two preceding embodiments, when a downtime period is greater than a threshold value, the flow of preforms can be controlled such that the preforms produced by the production machine are supplied to a box for rejects for shredding the preforms, in particular to a shredder. An overproduction of preforms can thus be prevented without having to interrupt the operation of the production machine; at the same time, by shredding them, the excess of preforms can be handled in the most space-saving way possible.

In a development of the two preceding embodiments, the threshold value can be determined by the control unit based on a storage capacity of the first storage device. This ensures that the preforms produced by the production machine are shredded only when the storage capacity of the first storage device is completely exhausted, thus preventing unnecessary material consumption.

In one embodiment, the component may comprise the production machine and the flow of preforms can be controlled such that preforms are supplied to the at least one container treatment machine from a second storage device. Thus, when the production machine is down, the flow of preforms can be controlled such as to maintain operation of the at least one container treatment machine and to avoid a downtime of the entire container treatment system.

In one embodiment, the first and second storage devices can be identical and designed as a storage unit. In that case, for example, the preforms supplied to the storage unit when the blow molding machine is down can be supplied again to the blow molding machine at a later point in time, which may be the case, for example, when the production machine is down.

In a development of the preceding embodiment, a sorting device can be arranged between the second storage device and the at least one container treatment machine, and the preforms can be supplied to the at least one container treatment machine in a sorted manner. This ensures that the preforms, which are typically stored as bulk material in the storage device, are separated before being supplied to the at least one container treatment machine and are transferred to the at least one container treatment machine in a sorted manner and, in particular, that a possible blockage at the at least one container treatment machine caused by unsorted preforms is prevented.

In one embodiment, the sorting device can be designed as a roller sorter or as a disk sorter.

DETAILED DESCRIPTION OF THE FIGURES

Figure 1A:
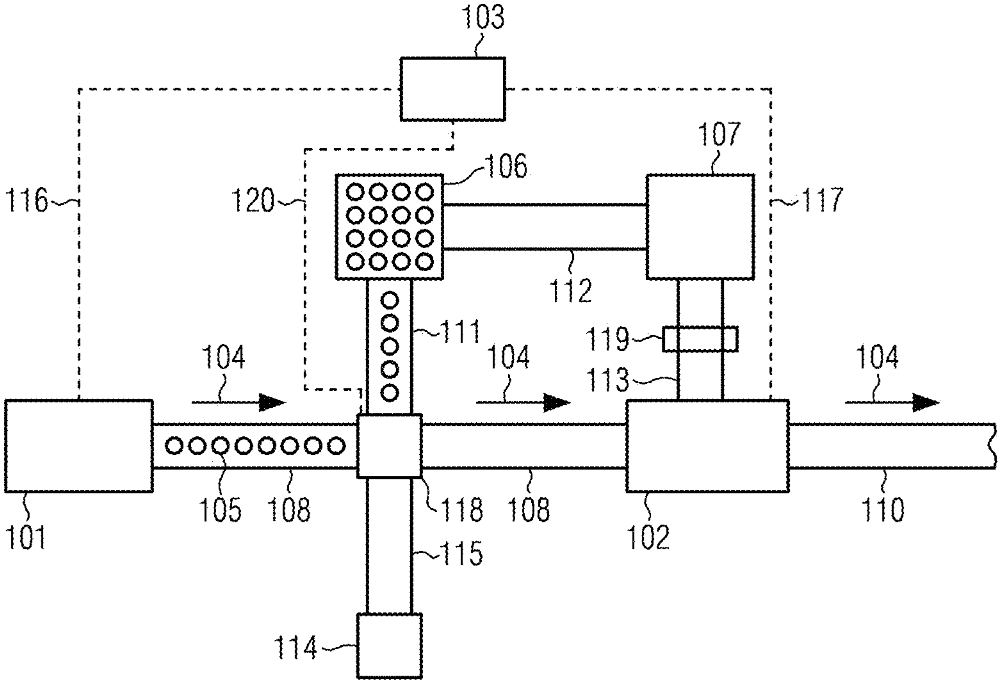
FIG. 1A: Operating state of a container treatment system for producing and treating a preform according to one embodiment
Figure 1B:
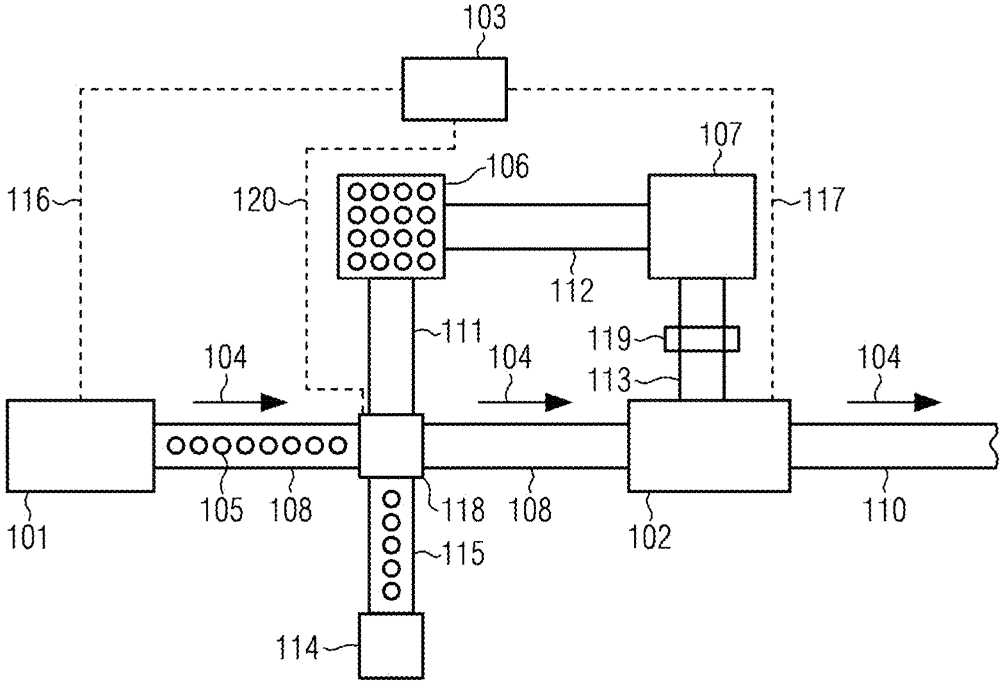
FIG. 1B: Operating state of a container treatment system for producing and treating a preform according to another embodiment
Figure 1C:
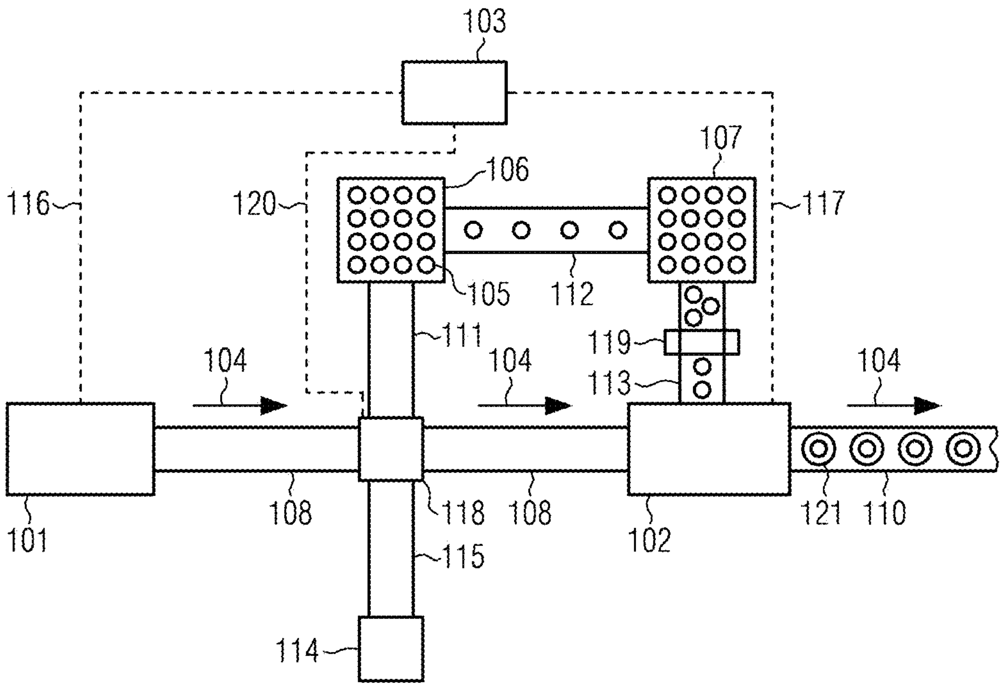
FIG. 1C: Operating state of a container treatment system for producing and treating a preform according to yet another embodiment

FIGS. 1A-1C show operating states of a container treatment system 100 for producing and treating a preform according to various embodiments.

According to the disclosure, the container treatment system 100 comprises a production machine 101, at least one container treatment machine 102 arranged downstream of the production machine 101 in a transport direction 104 of the preforms 105, and a control unit 103. According to the disclosure, the control unit 103 is configured to control a flow of preforms 105 in the container treatment system 100 based on a component of the container treatment system 100 being down.

The production machine 101 can be designed to produce preforms 105 used in the beverage industry from plastic, wherein the plastic may comprise polyethylene terephthalate (PET), polyethylene (PE) or polypropylene (PP). However, such design of the production machine 101 is not to be understood as limiting, so that the production machine 101 can also be designed to produce preforms 105 of any type from any plastic or thermoplastic material.

The production machine 101 can in particular be an injection molding machine. Alternatively, it can also be a device for producing preforms by means of a compression molding method or a device for producing preforms by means of an injection compression molding method. However, it can also be any other apparatus suitable for producing a preform.

In the embodiments described in connection with FIGS. 1A-1C, the at least one container treatment machine 102 is designed as a blow molding machine 102, wherein the blow molding machine 102 can, for example, be a stretch blow molding machine or an extrusion blow molding machine. For example, the blow molding machine 102 can be assigned an optional heating device in order to apply heat or electromagnetic radiation to the preforms 105 and thus generate a certain temperature or a certain temperature distribution in the preforms 105 before they are formed into containers. In one embodiment, the blow molding machine 102 can be designed as a rotary machine, wherein the rotary machine can comprise a plurality of blow mold holders arranged along the circumference of the rotary machine. Each blow mold holder can be assigned a blow unit, wherein the blow unit can be designed to apply compressed air to a preform located in a blow mold and preheated by the optional heating device and to form said preform into a container 121.

The containers 121 may be bottles used in the beverage industry. Alternatively, however, the containers may be any type of container, such as cans, jars, cups, or tubes, as used for example in the beverage, pharmaceutical, healthcare, or food industries, or any other container 121 which may be suitable for holding any liquid or pasty medium.

The design of the at least one container treatment machine 102 as a blow molding machine 102 is to be understood as being exemplary. The at least one container treatment machine 102 may also be designed as any other device suitable for treating containers. For example, the at least one container treatment machine 102 may also be designed as a device for pretreating containers, for example by means of a corona and/or plasma process, as a filler for filling containers with a beverage or any other liquid, as a labeling device, as a direct printing device, as a capper or as any other container treatment machine.

In one embodiment, it may also be provided for a combination of the container treatment machines just described or any other container treatment machine to be arranged downstream of the production machine 101 in a transport direction 104 of the preforms 105.

The control unit 103 may be designed as a computer, server or any other computer unit and may be connected to the production machine 101 and the blow molding machine 102 via cable connections 116, 117. The control unit 103 may also be connected to any other component of the container treatment machine 100 via a corresponding cable connection. In an alternative embodiment, it may alternatively be provided for the control unit 103 to be connected to the components of the container treatment system 100 via a wireless connection, for example via a WLAN connection. Due to the cable or wireless connection between the control unit 103 and the components of the container treatment system 100, the control unit 103 can, for example, detect a standstill at a component of the container treatment system 100 and, based thereon, control a flow of preforms 105 in the container treatment system 100. Operation of the container treatment system 100 can thus be maintained at least partially even if a component of the container treatment system 100 is down.

A first transport device 108 can be provided between the production machine 101 and the blow molding machine 102 in order to transport the preforms 105 produced by means of the production machine 101 to the blow molding machine 102. Transportation of the preforms 105 by means of the first transport device 108 from the production machine 101 to the blow molding machine 102 may be provided, for example, when the container treatment system 100 is in a normal state, i.e., when none of the components of the container treatment system 100 are down.

A second transport device 110 may be provided downstream of the blow molding machine 102 in a transport direction 104 of the preforms 105, by means of which second transport device the preforms 105 formed into containers 121 by the blow molding machine 102 can be transported to an optional further container treatment machine (not explicitly shown). The optional further container treatment machine can be any of the container treatment machines described above or a combination thereof. Thus, in one embodiment, for example, in a transport direction 104 of the preforms 105 or containers 121 downstream of the blow molding machine 102, a filler for filling the molded containers with a beverage or any other liquid may be provided.

In one embodiment, the container treatment system 100 may comprise a first storage device 106 for storing preforms 105 and/or a box for rejects 114 for shredding preforms 105. The box for rejects 114 can, in particular, be a shredder. In the embodiment discussed here, the storage device 106 and the box for rejects 114 may be arranged laterally next to the first transport device 108. The storage device 106 can be connected to the first transport device 108 by means of a third transport device 111, and the box for rejects 114 can be connected to the first transport device 108 by means of a fourth transport device 115. The arrangement of the first storage device 106 and the box for rejects 114 just discussed is to be understood as exemplary. The first storage device 106 and the box for rejects 114 may also be arranged at any other location of the container treatment system 100, provided that they are arranged such that the preforms produced by the production machine 101 are supplied to the first storage device 106 or to the box for rejects 114 instead of to the blow molding machine 102. In an alternative embodiment, it may also be provided, for example, for the first storage device 106 and the box for rejects 114 to be connected directly to the production machine 101 via corresponding transport devices, and for the preforms to not be first transferred to the first transport device 108.

In the embodiment discussed in connection with FIG. 1, the container treatment system 100 comprises an optional distribution device 118, wherein the distribution device 118 can be controlled by the control unit 103 such that the preforms 105 produced by the production machine 101 can either be guided from the first transport device 108 to the third transport device 111 and transferred to the first storage device 106, or can be guided from the first transport device 108 to the fourth transport device 115 and transferred to the box for rejects 114, or can be transferred by the first transport device 108 to the blow molding machine 102 in the transport direction 104.

To guide the flow of preforms 105 in the direction of the first storage device 106, in the direction of the blow molding machine 102 or in the direction of the box for rejects 114, the distribution device 118 can comprise a guide plate which can be aligned by the control unit 103, for example by means of a servomotor, such that the preforms 105 are guided either to the first storage device 106, to the blow molding machine 102 or to the box for rejects 114. To this effect, the distribution device can serve as a switch or can be designed as a switch. In order to be able to control the distribution device, the control unit 103 can be connected to the distribution device 118 via a cable connection 120 (alternatively, via a wireless connection). In the alternative embodiment briefly outlined above, where the first storage device 106 and the box for rejects 114 are directly connected to the production machine 101 via corresponding transport devices, it may also be provided for the distribution device 118 to be integrated in the production machine 101. In that case, the distribution device 118 can be arranged, for example, at an outlet of the production machine 101.

In an alternative embodiment, the distribution device 118 can also be designed as a robot, as a gantry type system or as any type of handling system. It is also conceivable for the distribution device 118 to be designed as a plurality of interconnected conveyor belts.

In one embodiment, the container treatment system 100 may comprise a second storage device 107 for preforms, wherein the second storage device can be connected to the first storage device via a fifth transport device 112 so that the preforms 105 stored in the first storage device 106 can be transferred from the first 106 to the second storage device 107. The second storage device 107 can, in turn, be connected to the blow molding machine 102 via a sixth transport device 113, so that the preforms 105 stored in the second storage device 107 can be supplied to the blow molding machine 102. Optionally, a sorting device 119 can be provided between the second storage device 107 and the blow molding machine 102. The preforms 105, which are typically stored as bulk material in the storage device, can be separated by means of the sorting device 119 and transferred to the blow molding machine 102 in a sorted manner. In one embodiment, the sorting device 119 can be designed as a roller sorter. The roller sorter can, for example, be designed such as to not only separate but also transport the preforms 105 from the second storage device 107 to the blow molding machine 102. In that case, the sorting device 119 and the second transport device 113 are designed as a unit. Alternatively, the sorting device 119 can also be designed as a disk sorter, for example.

In an alternative embodiment, it may also be provided for the first 106 and the second storage device 107 to be identical and designed as a storage unit, in which case the optional fifth transport device 112 is not required. In that case, it may be provided for the storage unit to be connected to the production machine 101 via the third transport device 111 and to the blow molding machine 102 via the sixth transport device 113. In that case too, the sixth transport device 113 can be designed, for example, as a roller sorter, so that the preforms can be transferred from the storage unit to the blow molding machine 102 in a sorted manner. In that case, for example, the preforms supplied to the storage unit when the blow molding machine is down can be supplied again to the blow molding machine at a later point in time, which may be the case, for example, when the production machine 101 is down.

In an alternative embodiment not discussed in more detail herein, it may also be provided for the first storage device 106 and the second storage device 107 to be designed as separate storage devices that are not connected to one another.

In the embodiment discussed in connection with FIGS. 1A-C, the optional transport devices 108, 110, 115, 111, 112 and 113 are shown as linear transport devices, for example. This type of design is to be understood as not limiting. Alternatively, the transport devices 108, 110, 115, 111, 112 and 113 can also be provided as transport star wheels or as a combination of linear transport devices and transport star wheels.

With reference now to FIGS. 1A-1C, three different operating states of the container treatment system 100 are discussed in more detail.

In the embodiment described in connection with FIG. 1A, the blow molding machine 102 arranged downstream of the production machine 101 in a transport direction 104 is down. The blow molding machine 102 being down can be, for example, the result of a malfunction of the blow molding machine 102, for example due to a defective component of the blow molding machine 102, or of a maintenance-related downtime of the blow molding machine 102, which can be caused, for example, by a maintenance-related replacement of a component or exchange of a consumable. In an alternative embodiment, for example a further optional container treatment machine arranged downstream of the blow molding machine 102 in a transport direction 104 of the preforms 105 may have a malfunction, or a combination of container treatment machines arranged downstream of the production machine 101 in a transport direction 104 may be down.

In order to be able to maintain partial operation of the container treatment system 100 even if the blow molding machine 102 is down, the control unit 103 can control the distribution device 118 such when the blow molding machine 102 is down that the preforms 104 produced by means of the production machine 101 are diverted from the first transport device 108 to the third transport device 111 and transferred to the first storage device 106. Continued operation of the production machine 101 and a further production of preforms 105 can thus be ensured even if the blow molding machine 102 or another optional container treatment machine is down. By further producing preforms 105 and transferring them to the first storage device 106, the preforms can be stored to stock and supplied to the blow molding machine 102 via the second storage device 107 for example at a later point in time once the malfunction on the blow molding machine 102 has been resolved. Alternatively, the preforms 105 stored in the first 106 or second storage device 107 can also be supplied to the blow molding machine 102, for example, only when the production machine 101 is down and no new preforms 105 can be produced. This embodiment is described in more detail in connection with FIG. 1C.

In one embodiment, it may be provided for the preforms 104 produced by means of the production machine 101 to be supplied to the first storage device 106 only until the period of downtime of the blow molding machine 102 reaches a certain threshold value. In one embodiment, the threshold value can be defined, for example, by a storage capacity of the first storage device 106 (for example, 5,000 or 10,000 preforms). It can thus be ensured that preforms 105 are supplied to the first storage device 106 only until the storage capacity of the first storage device 106 has been reached. For example, a blockage of the first 108 and third transport device 111 caused by preforms 105 that cannot be stored in the first storage device 106, and an associated potential malfunction of the production machine 101 can thus be prevented.

In one embodiment, it may also be provided for the preforms to be distributed between the first 106 and the second storage device 107. In that case, for example, the threshold value may be determined also based on a storage capacity of the first and second storage devices.

In an alternative embodiment, it may also be provided for the threshold value to be set on a customer- and/or variety-specific basis.

If the downtime period of the blow molding machine 102 exceeds the threshold value, it may be provided in one embodiment for the flow of preforms generated by the production machine 101 to be transferred not to the first storage device 106 but to the box for rejects 114 for shredding the preforms 105. This embodiment is described in more detail in connection with FIG. 1B.

FIG. 1B schematically shows the container treatment system 100 already discussed in connection with FIG. 1A in an operating state according to a further embodiment.

As already discussed in connection with FIG. 1A, the blow molding machine 102 is down in the embodiment of FIG. 1B as well. In contrast to the embodiment discussed in FIG. 1A, however, the control unit 103 controls the distribution device 118 in the embodiment of FIG. 1B such that the preforms 105 produced by the production machine 101 are diverted from the first transport device 108 to the fourth transport device 115 and transferred to the box for rejects 114 for shredding the preforms 105. As already mentioned above, this may be the case, for example, if the downtime period of the blow molding machine 102 exceeds a threshold value.

Alternatively, however, when the blow molding machine 102 or the at least one container treatment machine is down, it may also be provided for the preforms 105 to be supplied to the box for rejects 114 immediately and not only after the time interval of the blow molding machine being down has reached a threshold value.

In one embodiment, it may be provided that the preforms 105 shredded by the box for rejects 114 can be supplied again to the production machine 101 and new preforms can be produced from the shredded material.

A further embodiment, which shows the container treatment system 100 already discussed in connection with FIGS. 1A and B in a different operating state, is discussed in FIG. 1C.

In the embodiment of FIG. 1C, the production machine 101 is down so that no more preforms 105 can be produced by the production machine 101 and the blow molding machine 102 can no longer be supplied with preforms 105 via the first transport device 108.

In order to maintain at least partial operation of the container treatment system, i.e., to continue to allow for the formation of preforms 105 by the blow molding machine 102, it may be provided for the control unit 103 to control the second storage device 107 and the sixth transport device 113 such that the blow molding machine 102 is supplied with preforms 105 from the second storage device 107. The second storage device 107 can in turn be supplied with preforms 105 from the first storage device 106, wherein the preforms 105 can be transported from the first 106 to the second storage device 107 by means of the fifth transport device 112.

In order to ensure that the first 106 or second storage device 107 is at least partially filled with preforms 105 in the event of the production machine 101 being down, so that the blow molding machine 102 or the at least one container treatment machine can be supplied with preforms 105 in the event that the production machine 101 is down and partial operation of the container treatment system 100 can be maintained, it may be provided in one embodiment for the first 106 and the second storage device 107 to be at least partially filled with externally produced preforms before the container treatment system starts operating.

Alternatively, in one embodiment, it may also be provided, for example, when the container treatment system starts operating, for the control unit 103 to initially control the distribution device 118 such that the preforms 105 produced by the production machine 101 are supplied to the first 106 or the second storage device 107 during a certain time interval after the container treatment system 100 starts operating and that the storage devices can be filled with preforms.

The specific time interval can, for example, be selected based on a storage capacity of the first and/or second storage device or can be determined dynamically based on a fill level of the first and/or second storage device. If a certain fill level of the first and/or the second storage device is reached, the control unit 103 can be designed to control the distribution device 118 such that the preforms 105 produced by the production machine 101 are supplied to the blow molding machine 102 and that the container treatment system 100 can start to operate in normal mode. For example, it may be provided for the first storage device 106 and the second storage device 107 to be filled with a quarter, half or three quarters of the maximum storable quantity of preforms.

The invention claimed is:

1. A container treatment system for producing and treating preforms, wherein the container treatment system comprises a production machine for producing preforms, at least one container treatment machine arranged downstream of the production machine in a transport direction of the preforms, and a control unit, wherein the control unit is configured to control a flow of preforms in the container treatment system based on a component of the container treatment system being down, wherein, when a downtime period is less than a threshold value, controlling the flow of preforms includes transferring the preforms produced by the production machine to a first storage device, and wherein, when a downtime period is greater than a threshold value, controlling the flow of preforms includes transferring the preforms produced by the production machine to a box for rejects for shredding the preforms.

2. The container treatment system according to claim 1, wherein the component comprises the at least one container treatment machine.

3. The container treatment system according to claim 1, wherein the control unit is configured to determine the threshold value based on a storage capacity of the first storage device.

4. The container treatment system according to claim 1, wherein the component comprises the production machine.

5. The container treatment system according to claim 4, wherein controlling the flow of preforms comprises supplying preforms to the at least one container treatment machine from a second storage device.

6. The container treatment system according to claim 5, wherein a sorting device is arranged between the second storage device and the at least one container treatment machine, and the preforms can be supplied to the at least one container treatment machine in a sorted manner.

7. A method for producing and treating preforms in a container treatment system, wherein the container treatment system comprises a production machine for producing preforms, at least one container treatment machine arranged downstream of the production machine in a transport direction of the preforms, and a control unit, wherein a flow of preforms in the container treatment system is controlled by the control unit based on a component of the container treatment system being down, wherein, when a downtime period is less than a threshold value, the flow of preforms is controlled such that the preforms produced by the production machine are transferred to a first storage device, and wherein, when a downtime period is greater than a threshold value, the flow of preforms is controlled such that the preforms produced by the production machine are supplied to a box for rejects for shredding the preform.

8. The method according to claim 7, wherein the component comprises the at least one container treatment machine.

9. The method according to claim 7, wherein the threshold value is defined by the control unit based on a storage capacity of the first storage device.

10. The method according to claim 7, wherein the component comprises the production machine and wherein the flow of preforms is controlled such that preforms are supplied to the at least one container treatment machine from a second storage device.

11. The method according to claim 10, wherein a sorting device is arranged between the second storage device and the at least one container treatment machine, and the preforms are supplied to the at least one container treatment machine in a sorted manner.

12. The container treatment system according to claim 1, wherein the production machine is an injection molding machine.

13. The method according to claim 7, wherein a production machine is an injection molding machine.

14. The container treatment system according to claim 1, wherein controlling the flow of preforms includes transferring the preforms to a shredder.

15. The method according to claim 7, the flow of preforms is controlled such that the preforms produced by the production machine are supplied to a shredder.

* * * * *